United States Patent [19]

Jupp et al.

[11] Patent Number: 4,714,215
[45] Date of Patent: Dec. 22, 1987

[54] AIRCRAFT WING AND WINGLET ARRANGEMENT

[75] Inventors: Jeffrey A. Jupp, Filton; Peter H. Rees, Hatfield, both of United Kingdom

[73] Assignee: British Aerospace PLC, London, England

[21] Appl. No.: 873,526

[22] Filed: Jun. 12, 1986

Related U.S. Application Data

[63] Continuation-in-part of Ser. No. 601,081, Apr. 16, 1984, abandoned.

[30] Foreign Application Priority Data

Apr. 15, 1983 [GB] United Kingdom ............... 8310224

[51] Int. Cl.$^4$ ............................................. B64C 23/06
[52] U.S. Cl. ........................................ 244/199; 244/91
[58] Field of Search ................................. 244/199, 91

[56] References Cited

U.S. PATENT DOCUMENTS

| | | | |
|---|---|---|---|
| 2,576,981 | 12/1951 | Vogt | 244/199 |
| 4,245,804 | 1/1981 | Ishimitsu et al. | 244/199 |
| 4,365,773 | 12/1982 | Wolkovitch | 244/199 |

OTHER PUBLICATIONS

NACA-TN-2229, pp. 23,25,30.

Primary Examiner—Joseph F. Peters, Jr.
Assistant Examiner—Rodney Corl
Attorney, Agent, or Firm—Cushman, Darby & Cushman

[57] ABSTRACT

An aircraft wing has a winglet extending from the tip to reduce drag and thereby improve the efficiency of the aircraft. Hitherto such winglets, although they have succeeded in reducing drag, they have also increased the wing bending moment at high coefficients of lift sufficient to require a strengthened and therefore heavier wing. Moreover, they have suffered flow break-away at such high coefficients of lift and have therefore incurred aircraft control problems. A winglet according to the present invention, is of high sweep back and low Aspect Ratio. Its resulting increase in the bending moment on the wing is relatively low even at high lift coefficients and since it changes from conventional attached flow to vortex flow and therefore does not experience random flow break-away at high lift coefficients, it does not harm aircraft control.

2 Claims, 16 Drawing Figures

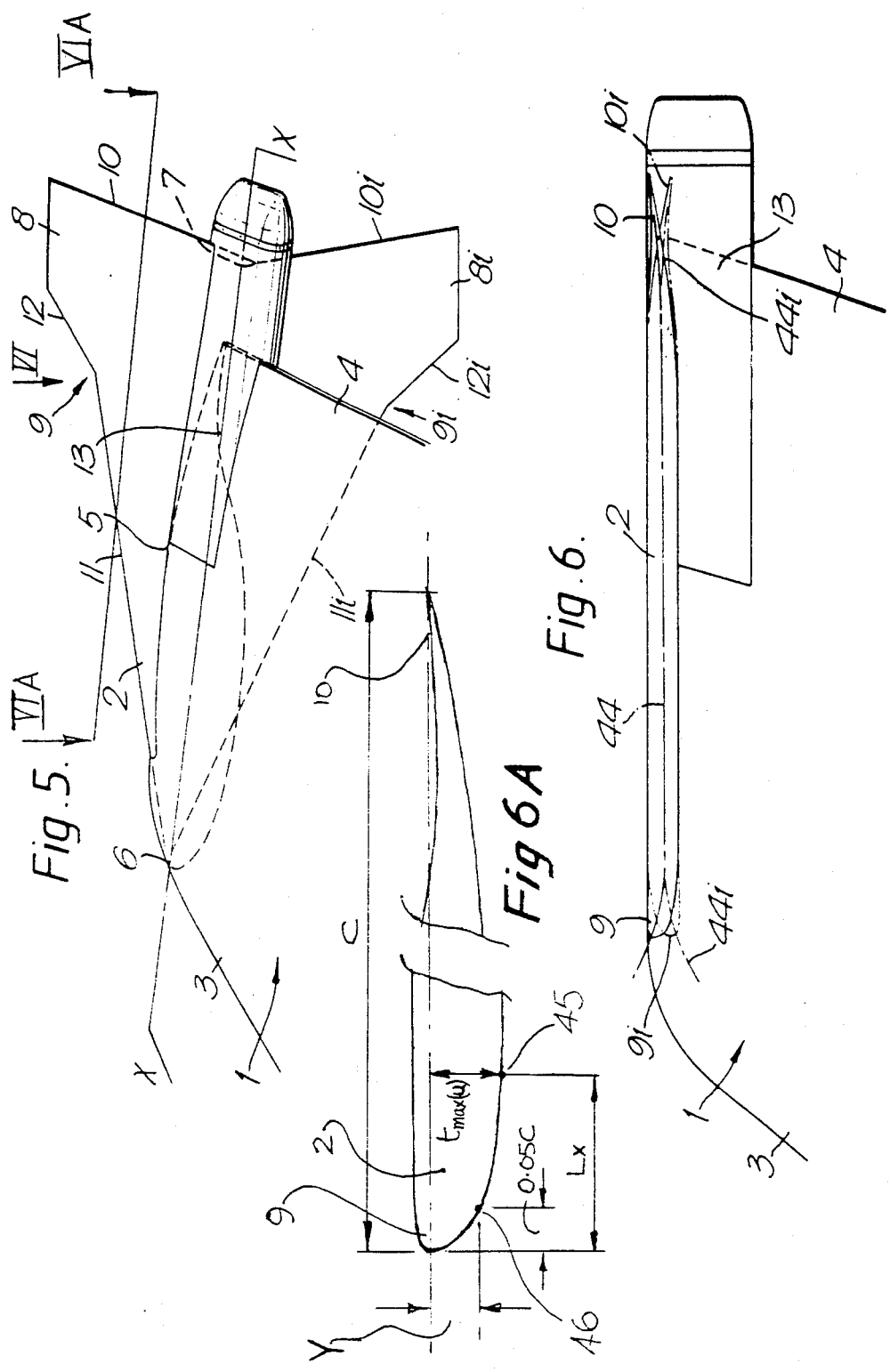

AIRCRAFT WING AND WINGLET ARRANGEMENT

This is a continuation-in-part of application Ser. No. 601,081 filed Apr. 16, 1984, now abandoned.

This invention relates to aircraft wings and winglets therefore.

In this specification the term "winglet" denotes "small wing" that is to say a cambered lift producing device distinct from a flat plate. It is known to provide a flat end plate to the tip of an aircraft wing. In NACA TN 2229, entitled 'The effect of End Plates on Swept Wings at Low Speed' and dated November 1950, NACA reported tests upon a whole series of end plates for wings. These end plates provided no significant advantages because they were just what their name implied—flat plates. They were not aerofoils in the true sense and were formed of sheet material of thicknesses of 1/16 or ⅛ inch. The edges were rounded or bevelled. Some plates had relatively high sweepback.

It was one of the great pioneers of aeronautical science—Lanchester—who back in the early part of this century first expounded the theory of 'trailing vortex drag' which is a fundamental result of the lift carried by the wing. This drag is caused by flow around the tip of a wing from the region of high pressure below to the region of flow pressure above. Not long afterwards the idea of 'end plates' at the wing tip involved, obviously if drag was being caused by the flow around the tip, it could be advantageous to put a fence in the way and thus help to prevent this flow. This idea was perfectly valid and, indeed, reduced the strength of the tip vortices. However, such 'end plates' had a relatively large surface area with a high inherent drag of their own such that all in all they offered no significant advantage.

It is also known to provide a winglet at the tip of an aircraft wing. U.S. Pat. No. 2576901 (VOGT) is one of many disclosures of wing tip devices using aerodynamic features rather than merely plates to modify the wing tip vortex flow and to extract advantage from that flow. VOGT discloses camber in reverse senses on the upper and lower portions with the upper and lower portions joined to effect a twisted contour very similar to that of a propeller. His disclosure is one of low sweepback or none at all.

By the data of his patent, VOGT is shown to be a fairly early exponent of the application of aerodynamic principles to the original end plate designs as exemplified by NACA. Back in the late 1960's—early 1970's when the fuel crises were making the search for fuel efficiency ever more important, Whitcombe of NASA (the successor to NACA) in the United States was one of the main exponents in reconsidering the 'end plate' concept. As with VOGT, he proposed what one might call an aerodynamic fence or winglet. Since such a winglet replies on the generation of a pressure field opposing the flow around the tip it presents a much smaller physical barrier than a mere end plate. The task of sustaining a pressure differential efficiency with minimum drag is exactly that of a wing and in this respect the term 'winglet' is most appropriate. Thus, the old 'end plate' concept was brought up to date using modern sophisticated design techniques such that at least in certain applications winglets could now be shown to offer advantages over the more traditional method of reducing 'trailing vortex drag'—that is, increasing the span of the wing.

However, the close similarity between the design requirements of the winglet and main wing brings its own problems. For example, the wings for modern large civil transport aircraft are usually fitted with powerful leading edge slats or similar devices, which deploy at the low flight speeds necessary for safe take-off and landing. These devices prevent the wing 'stalling', that is, they stop the flow over the wing breaking down with a subsequent severe increase in drag and loss of lift at the high wing incidences necessary to maintain flight. If the winglets are not to 'stall' under similar conditions (again leading to increased drag, or affecting the handling of the aircraft) they are likely to require slats as well—an unacceptable further complication.

To overcome the winglet stalling problem outlined above without adding slats or other complicated and expensive high lift devices on the winglet itself, some aerodynamic means had to be sought. It will be appreciated that if a winglet stalled, it would very seriously affect handling of the aircraft and would increase drag dramatically just when high performance is most required of an aircraft.

Thus, the present invention utilizes with the idea of harnessing what could be termed the Concorde factor, largely unknown at the time of the NACA report, and which involves providing winglets with an extra ingredient which had previously only been utilized on horizontal wings and adapting that ingredient for use on vertical winglets.

The ingredient is high leading edge sweep combined with a special leading edge cross section, and the new winglets having this are found to have innocuous qualities over the whole flight envelope. Under conditions when the conventional attached flow 'stalls' over a straight or low-to-moderately swept planform, a highly swept planform winglet generates a well ordered leading edge vortex flow, giving no sudden changes in aircraft handling characteristics, that is to say, it changes smoothly from one type of flow to the other. This is also true if premature 'stalling' were to be caused by ice forming on the leading edge of the winglet, the high sweep feature again reducing its effects under conditions when the main wing is protected by a hot air anti-ice system.

However, since winglets tend to maintain the pressure difference above and below the main wing, they must increase the lift near the wing tip. Although the effect is not as large as for a span extension that is to say a horizontal outward continuation of the wing, they do therefore adversely affect the bending load on the inner regions of the main wing.

Accordingly, two major objects of the present invention are (a) to reduce the lift induced drag of an aircraft wing compared with a similar wing not so fitted by the addition of a winglet without so increasing the bending moments experienced by the wing particularly in the manoeuvre conditions, that little or no strengthening is required, and (b) to prevent or at least minimise flow breakaway over the winglet so that no handling problems are caused by fitting the winglet.

According to the invention, an aircraft wing includes main wing means having a median plane and a wing tip region of specified chord having a leading edge region and a trailing edge region, and winglet means extending from said wing tip region, the winglet means having a root region with both a forward extremity and a rearward extremity in the region of the median plane, the forward extremity of the winglet means lying at or rearward of the leading edge region of the main wing means, a tip region remote from the median plane, a leading edge region extending between the forward extremity and the tip region of high sweep back over a least part of its length at or near the root region, and a trailing edge region extending between the rearward extremity of the root region and the tip region, the value of the square of the distance from the tip region to the root region divided by the area bounded by and including the root region, the tip region, the leading edge region, and the trailing edge region being 1.5 or less, and having a cambered proile, whereby in air flow break-away conditions the air flow over the winglet means changes from conventional attached flow to vortex flow, and whereby the bending load exerted upon the main wing means by the presence of the winglet means increases relatively slowly as main wing lift increases.

Preferably as said cambered profile of the winglet means includes, when viewed in a cross section generally parallel to the line of flight the wing will adopt in use, a chordal line extending between a forward extremity and a rearward extremity of the winglet means at said cross section, the length of this line being the local chord of the winglet means, a first point on the profile, a second point on the profile, said first point having a first co-ordinate, extending normal to the chordal line, being the maximum distance between said chordal line and the winglet profile at that cross section, and a second co-ordinate, extending along the chordal line, being the distance the first co-ordinate lies from the forward extremity at that cross section, said second point having a third co-ordinate, extending normal to the chordal line, being the distance between said chordal line and the winglet profile at that cross section, and a fourth co-ordinate extending along the chordal line and being 0.05 of the local chord aft of the forward extremity, the value of said first co-ordinate divided by said second co-ordinate being equal to or less than 0.5, the value of said third co-ordinate divided by the local chord being equal to or less than 0.075 and equal to or greater than 0.025, and the value of said first co-ordinate divided by the local chord being equal to or less than 0.15 and equal to or less than 0.025.

By this arrangement, such a winglet provides a drag reduction compared with the same wing not so equipped. In particular, the winglet can be arranged to provide its most useful drag reduction at a particular lift coefficient of the wing on which it is to be attached, for example that lift coefficient suitable for long range cruise, but when the coefficient of lift of the wing is increased, for example for in flight manoeuvres, the rate and hence the total increase of wing bending moment as a direct result of the presence of the winglet is much lower than hitherto.

Naturally, although described for ease of comparison with reference to an existing wing, this advantage is applicable to wings designed from the outset to include a winglet according to the invention.

Furthermore, in conditions when previously known winglets would tend to experience flow breakaway, the winglet of the present invention develops strong vortex sheets which, by flowing over its surfaces prevent random flow breakaway. Such conditions leading to flow breakaway on previous winglets occur when the coefficient of lift of the wing is increased by increasing incidence and there is considerable flow from the undersurface to the upper surface around the wing tip.

The arrangement also ensures that ice does not readily form on the winglet, and, if it does form, it merely causes vortex sheets to be formed with no significant effects on aircraft handling.

Some embodiments of the invention applied to a subsonic transport aircraft are described by way of example with reference to the accompanying drawings in which:

FIG. 1 is a perspective view of an aircraft wing tip looking outboard, the illustrated air flow being typical of that in cruising flight, FIG. 2 is a similar view to that of FIG. 1 but with the illustrated air flow being typical of that in high lift coefficient flight, FIG. 3 is a similar view to that of FIG. 1 but showing an alternative embodiment again in cruise flow conditions.

FIG. 4 is a similar view to that of FIG. 3 but showing the alternative embodiment in high-lift coefficient flight, FIG. 5 is a view of the embodiment of FIGS. 3 and 4 but illustrating the incorporation of housing means, FIG. 6 is a view on Arrow VI of FIG. 5, FIG. 6A is an enlarged view of the winglet 2 shown in FIG. 6, this view being effectively a cross section upon line VIA—VIA of FIG. 5 generally parallel to the line of flight FIG. 7 illustrates a true side view of the embodiment of FIGS. 1 and 2 looking inboard, FIG. 8 illustrates a true side view of the embodiment of FIGS. 3 and 4 looking inboard, FIGS. 9a, b, c, are similar views to that of FIG. 7 showing alternative embodiments, FIG. 10 is a similar view to that of FIG. 8 showing an alternative embodiment, FIG. 11 is a front view of a wing tip with winglet illustrating various angles of cant, FIG. 12 is a graph illustrating (change of wing bending moment) divided by (dynamic pressure) plotted against (wing lift increase) divided by (dynamic pressure) for three forms of wing tip arrangement relative to an unmodified wing, and, FIG. 13 is a graph showing (drag reduction) divided by (dynamic pressure) plotted against (wing lift increase) divided by (dynamic pressure) for the same three forms of wing tip arrangement relative to the unmodified wing.

In each case (wing lift) divided by (dynamic pressure) is proportional to coefficient of lift. Referring initially to FIGS. 1 and 2, an aircraft wing includes a main wing 1, of which only a tip region is shown, and winglets 2 extending from the tip region upwards and downwards from a median plane X—X of the wing. The median plane X—X is that plane extending through or near the foremost and rearmost extremities of the wing.

The wing tip has a leading edge region 3 and a trailing edge region 4.

Although illustrated as having winglets 2 extending upwards and downwards from the median plane X—X a winglet 2 may extend only in one of the directions. Moreover, although illustrated as symmetrically disposed about the median plane when extending in both directions, winglets 2 may not be necessarily so disposed.

As illustrated in FIGS. 1 and 2, a winglet 2 has a root region 5 with a forward extremity 6 and a rearward extremity 7, an upper tip region 8 and an upper leading edge region 9 extending between the forward extremity 6 and the tip region 8. The leading edge region is of high sweepback, in this case being at a constant angle Q typically 70° measured from the normal to the median plane X—X. A trailing edge region 10 extends from the rearward extremity 7 to the tip region 8. The range of suitable angles and other parameters are disclosed with reference to FIG. 7. The aspect ratio (AR) of that portion above the median plane X—X, that is to say, the ratio of the square of the distance from the tip region 8 to the root region 5 when measured normal to the median plane (i.e. the square of the semi-span) and the area bounded by and including the root region 5, the tip region 8, the leading edge region 9 and the trailing edge region 10 (i.e. the gross area above the median plane X—X) is typically 0.45. It is thus of low aspect ratio. The overall aspect ratio for winglets extending both above and below the wing median plane X—X is typically 0.90.

In this embodiment, a further winglet 2 extending below is a mirror image of that extending above. The components thereof are given the suffix "i", signifying "inverted".

The sweep angle of the trailing edge region 10 is selected to provide adequate chord length of the root region 5 for structural purposes and/or to aid aerodynamic design of the gully between the main wing 1 and the winglets.

Referring now to FIGS. 3 and 4, winglets 2 have similar configuration to that of FIGS. 1 and 2 and are thus allocated like reference numerals for like items.

It is only in respect of the leading edge regions 9 and 9i that significant difference is present. The region 9 and 9i are each formed of an inboard region 11 lying near the root region 5 and an outboard region 12 lying near the tip region 8. The inboard region 11 is of high sweepback angle Q1 typically 70° measured from the normal to the median plane X—X whilst the outboard region 12 is of less sweepback angle Q2, typically 45°.

The aspect ratio of the winglet above the median plane X—X is typically 0.80 and for the pair of winglets extending above and below the median plane is typically 1.60. Although this aspect ratio is naturally greater than that for the embodiment of FIGS. 1 and 2, it is still defined as 'low'.

The inboard region 11 typically extends over the inboard 60% of the distance between the tip region 8 and 8i and the root region 5 and 5i, whilst the outboard region 12 typically extends over the outboard 40%. As is shown in FIG. 4, it is possible to allow the flow over the outboard regions 12, 12i and the tip regions 8, 8i to break away as indicated by the stream of bubbles 12', 12'i at high lift and/or high speed conditions. The vortex flow over the inboard regions 11, 11i are effective to keep this break away flow limited in extent and thus minimise any effect on aircraft handling. This arrangement has advantage in that aerodynamic load on the winglets is reduced in otherwise high load conditions of the wing and winglets.

FIGS. 5 and 6 illustrate how the root region 5 of the winglets 2, irrespective of the shape of their leading edge region 9, 9i, can be extended inboard to modify the gully region between the surface of the main wing 1 and the inboard surface of each winglet 2 to improve the quality of flow in that region. Conveniently, this extended root region can provide a housing 13 for an item such as navigation light, antenna, or fuel jettison duct.

FIG. 6 illustrates how the leading edge regions 9, 9i, and trailing edge regions 10, 10i, and indeed the winglets as a whole, can be cambered to enhance particular flow characteristics over the winglets 2 at certain operating conditions of the main wing. This is irrespective of the fitting of the housing 13. As is shown, that winglet lying above the median plane X—X has its leading edge and/or its trailing edge regions 9, 10 cambered to cause a median line 44, (that is to say a line which, at any chordwise station, lies equidistant between the opposite surfaces of the winglet) to droop in an outboard direction of the main wing whilst that winglet lying below has its leading edge and/or its trailing edge regions 9i, 10i cambered to cause the median line 44i to droop in an inboard direction.

These directions of droop are essential so that the vortex sheets developed when vortex flow takes place are caused to flow over an inboard facing surface (with reference to the main wing) of an upwardly extending winglet and over an outboard facing surface (with referenced to the main wing) of a downwardly extending winglet.

FIG. 6A is a typical cross section upon one of a series of cross sections taken in planes generally parallel to the line of flight of the aircraft. The inboard surface of the leading edge region 9 and the outboard surface of the lower leading edge region 9i of the upwardly extending and downwardly extending winglets 2 are contoured to help provide the desired air flow characteristics over the winglet in the various phases of flight described. For ease of description reference is made only to the upper leading edge region 9. The region 9i may be similar in contour but not necessarily so.

Thus the inboard surface of the region 9 is shaped over at least a proportion of the leading edge region, the following co-ordinates are applicable:

$$tmax(u)/L_x \leq 0.5$$

$$0.075 \geq y/c \geq 0.025$$

$$0.15 \geq tmax(u)/C \geq 0.025$$

where:

C = Length of the local chordal line, that is to say the longest line extending between the forward and rearward extremities of the winglet at a given cross section, tmax(u) = maximum distance measured between the surface profile and the chordal line C, the point of maximum distance being references 45, $L_x$ = the distance tmax(u) lies after of the forward extremity along the chordal line, Y = the distance between the chord line (length C) and a point 46 on the profile surface situated 0.05C aft of the forward extremity of the winglet at that cross section.

FIG. 7 illustrates an embodiment of the arrangement of FIGS. 1 and 2 on which typical and limiting values of dimensions are given using the specified chord $C_T$ of the main wing tip as reference.

Thus:

FIG. 7 illustrates an embodiment of the arrangement of FIGS. 1 and 2 on which typical and limiting values of dimensions are given using the specified chord $C_T$ of the main wing tip as reference.

Thus:

| Parameter | Typical Value | Limiting Values | |
|---|---|---|---|
| | | Upper Limit | Lower Limit |
| Q, $Q_i$ | 70° | 85° | 50° |
| h, $h_i$ | 0.17 $C_T$ | 0.5 $C_T$ | — |
| L | 0.62 $C_T$ | 1.25 $C_T$ | — |
| F | 0.05 $C_T$ | 0.5 $C_T$ | −0.75 $C_T$ |
| AR (when span = h + $h_i$) | 0.90 | 3.0 | — |

FIG. 8 illustrates an embodiment of the arrangement of FIGS. 3 and 4 on which typical and limiting values of dimensions are given again using the specified chord $C_T$ of the main wing tip as reference.

Thus:

| Parameter | Typical Values | Limiting Values | | | |
|---|---|---|---|---|---|
| | | Upper Limit | Comments | Lower Limit | Comments |
| $Q_1$, $Q_{1i}$ | 70° | 85° | When at 85° applied, over at least inner 10% of semi-height ($h_2$) | 50° | |
| $Q_2$, $Q_{2i}$ | 45° | — | | 35° | When at 35° applied, over at most outer 20% of semi-height ($h_2$) |
| $h_1$ $h_{1i}$ | 0.6 $h_2$ | $h_2$ | | 0.3 $h_2$ | |
| $h_2$ $h_{2i}$ | 0.33 $C_T$ | $C_T$ | | — | |
| L | 0.85 $C_T$ | 1.25 $C_T$ | | — | |
| P | 0.05 $C_T$ | 0.5 $C_T$ | | −0.75 $C_T$ | |
| AR (when span = $h_2$ + $h_{2i}$) | 1.6 | 3.0 | | — | |

In each case, the aspect ratio (AR) is for a winglet pair which is symmetrical above and below the median plane X—X, but such symmetry is not essential.

FIGS. 9a, b and c, and FIG. 10 show various alternative winglets by way of example. These examples are not exhaustive and are illustrated merely to show some embodiments of the invention.

In FIG. 9a, P=0 and L=0.6$C_T$,
in FIG. 9b P=−0.36$C_T$ and L=0.6$C_T$, and,
in FIG. 9c P=0 and L=$C_T$.
As can be seen in FIG. 9a, h=$h_i$,
FIG. 9b, h>$h_i$ and
in FIG. 9c, h>$h_i$.

In FIG. 10, which illustrates a version of the embodiment of FIGS. 3 and 4 with the intersections of the twin leading edge regions 11 and 12 and the intersection of the region 12 with the tip region 8 are smoothly blended. In this embodiment
P=0.10$C_T$ and
L=0.95$C_T$.

Figure 12:
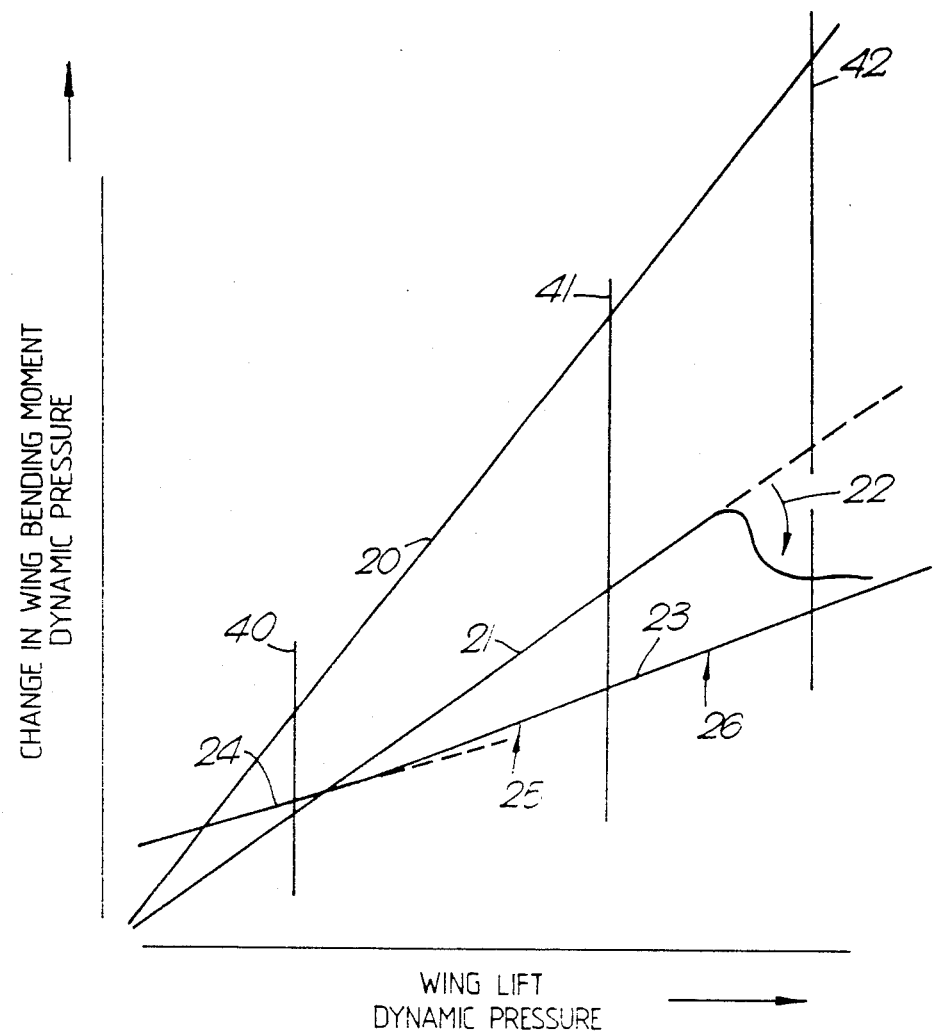
FIGS. 12 and 13 are included to graphically show how the winglets of the present invention compare with two other wing tip devices.

In FIG. 12, graph 20 illustrates the change of main wing bending moment with lift increase due to the presence of a wing tip extension in the form of an increase in span of the main wing. As can be seen, the slope is relatively steep.

Graph 21 illustrates the change of main wing bending moment with lift increase due to the presence of winglets of relatively lower sweepback and relatively higher aspect ratio than the winglets of the present invention, that is to say graph 21 relates to known winglets. As can be seen, the slope is less steep than graph 20. However, at region 22, stalling of the winglets can occur with attendant flow break-away. Thus the curve dips sharply and is indicative of potential handling problems.

Graph 23 illustrates the change of main wing bending moment with lift increase due to the presence of winglets according to the invention. As can be seen, the slope is less steep than either of the other two graphs. It follows one slope, region 24, where conventional attached flow is taking place, and subsequently, after a transition period, region 25, where a mixture of flows may be present, it follows a somewhat steeper slope, region 26, where the attached flow is replaced, at least to a large extent, by a stable leading edge generated vortex flow. These distinct types of flow are illustrated in FIGS. 1, 3 and 2, 4 respectively and a brief discussion with respect to these Figures follows below.

Figure 13:
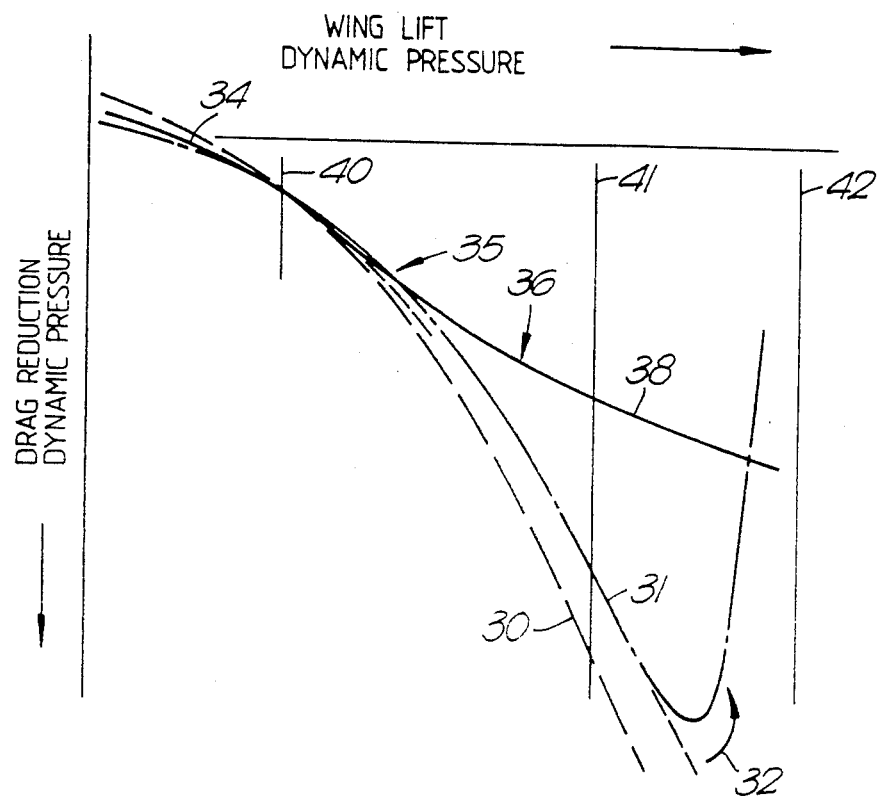

In FIG. 13, graph 30 illustrates the drag reduction with lift increase due to the presence of the same wing-tip extension as that of graph 20. As can be seen, there is a high and increasing drag reduction, but its associated bending moment increase renders such an arrangement undesirable. Graph 31 illustrates drag reduction with lift increase due to the presence of the same, known, winglets as that of graph 21. As can be seen, there is a high and increasing drag reduction, but at region 32 (associated with region 22) flow breakaway can occur leading to random but massive drag increases and hence likely aircraft handling problems. This, together with the relatively high increase in bending moment, renders such an arrangement potentially undesirable.

Graph 33 illustrates drag reduction with lift increase due to the presence of winglets according to the invention, that is to say similar winglets to that of the graph 23. As can be seen at region 34, corresponding to region 24, where there is conventional attached flow there is a similar order of drag reduction to graphs 30 and 31. In the transition region of flow 35, corresponding to region 25, the graph reflexes and the increase of drag reduction is indicated at 36, which is a region of vortex flow, corresponding to region 26. There is no flow breakaway, and thus no aircraft handling problems, and the relatively low drag reduction is acceptable because it is arranged to occur in other than aircraft cruising flight. Moreover, the relatively low bending moment increase is of vital importance since the main wing requires little or no strengthening.

In FIGS. 12 and 13, bar 40 indicates the design coefficient of lift point for efficient cruising flight, i.e. flight with a predetermined low level of drag, bar 41 indicates the design coefficient of lift point for the wing structure to be sufficiently strong to accommodate for example a 2½ g manoeuvre (it is usually a high speed design point) and bar 42 indicates the design coefficient of lift point at which stall can take place (it is a low speed design point). It is up to this latter point that good handling characteristics, that is to say controlled—non random—flow break-away should be maintained.

Figure 1:
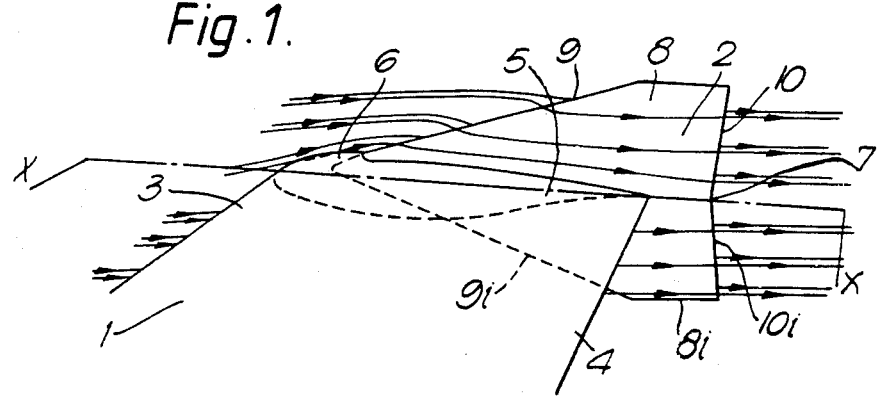
Figure 3:
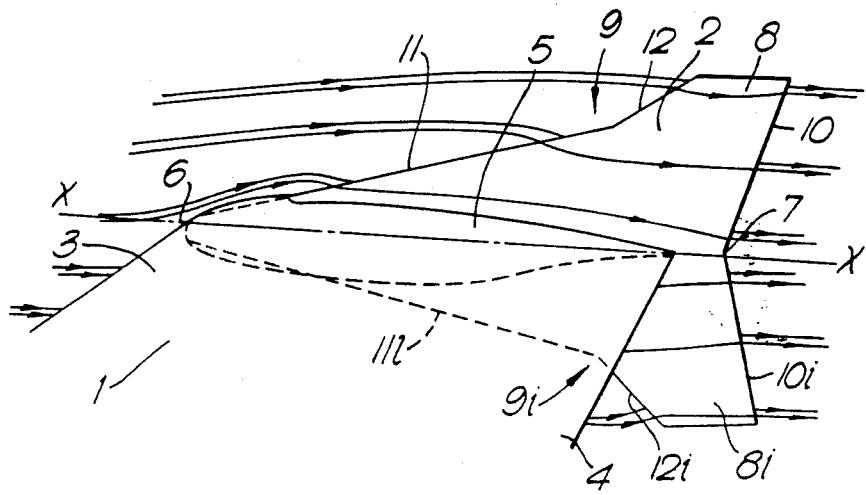

Reverting now to FIGS. 1 and 3, these illustrate conventional attached flow over the winglets 2 in cruise lift coefficient conditions, the winglets are thus operating in the regions 24 and 34 illustrated in FIGS. 12 and 13.

Figure 2:
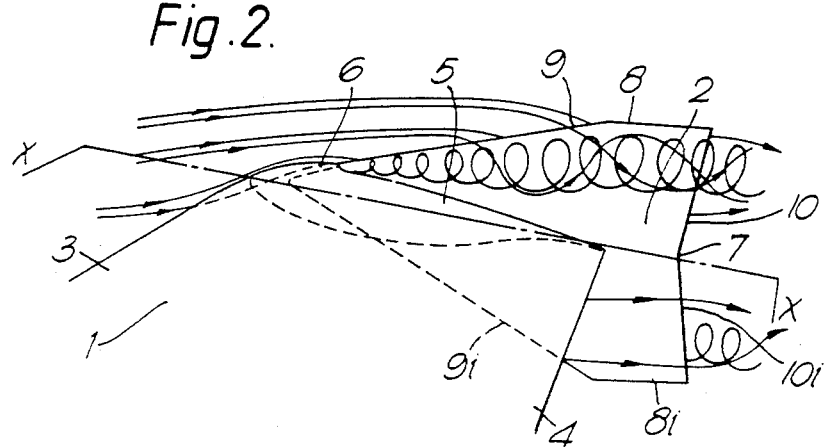
Figure 11:
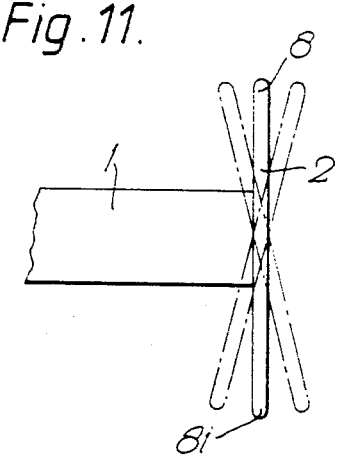
FIG. 11 illustrates how the upper and lower winglets 2 may be canted with respect to one another, both inboard and outboard, or they may be co-planar but still canted.
Figure 4:
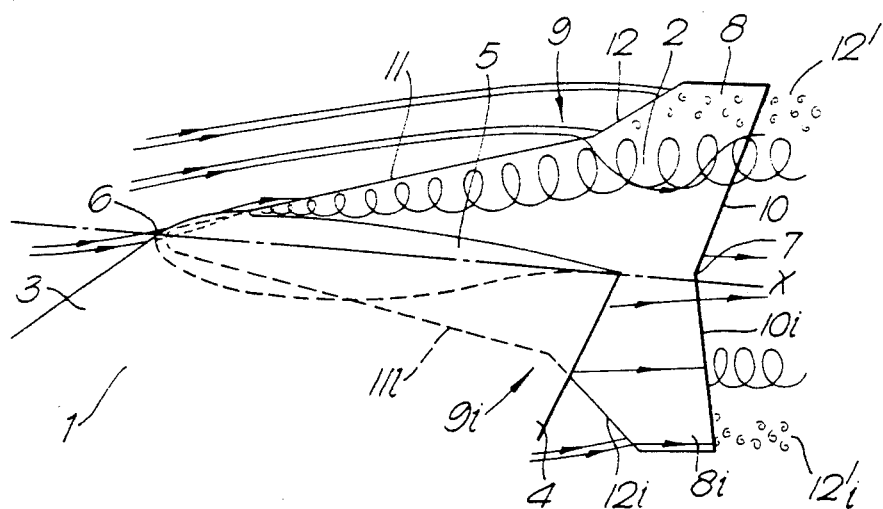
Figure 7:
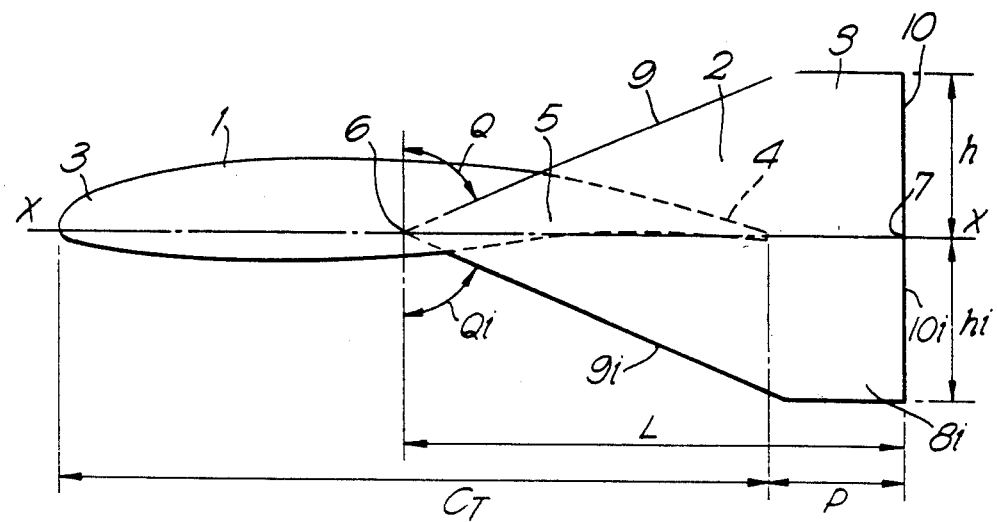
Figure 8:
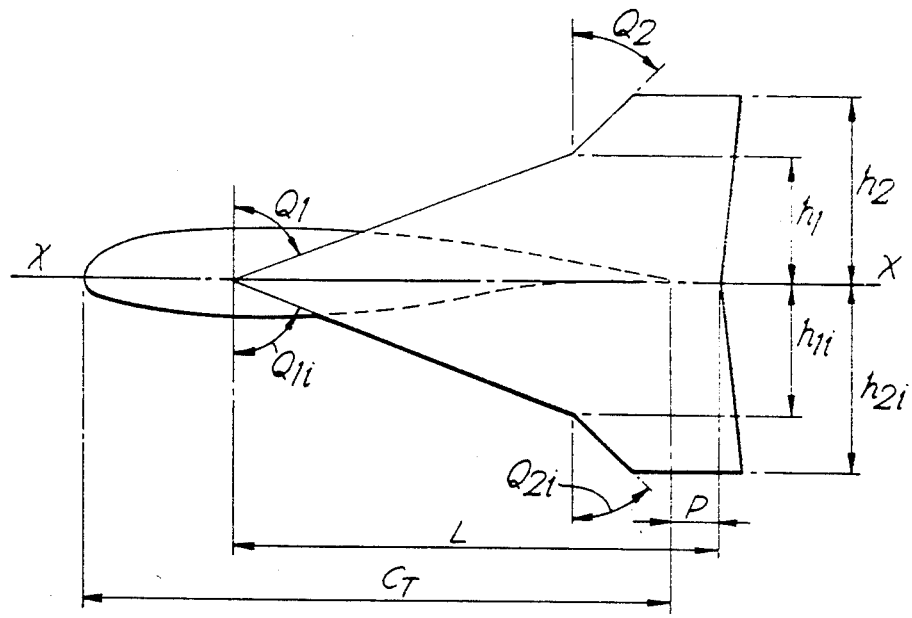
Figure 9A:
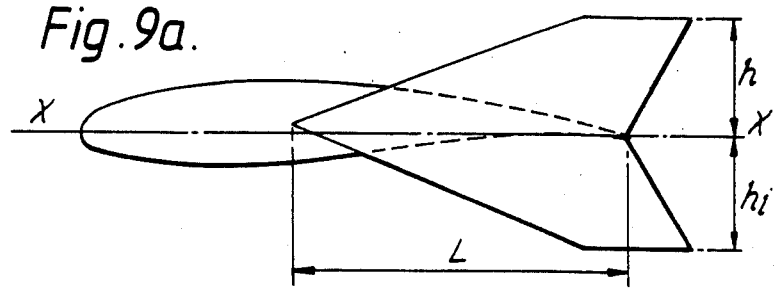
Figure 9B:
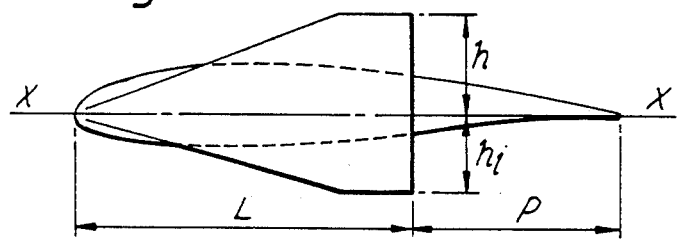
Figure 9C:
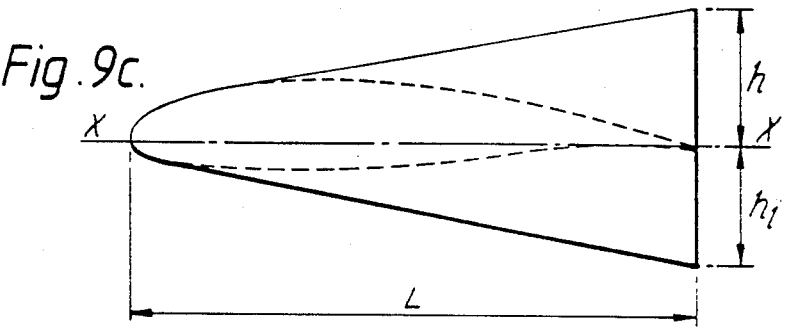
Figure 10:
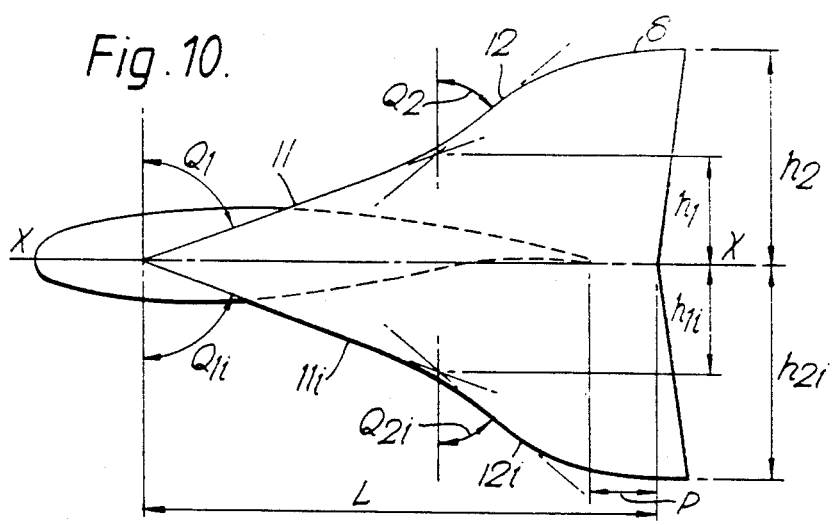

FIGS. 2 and 4 illustrate the development of stable vortex flow in high lift coefficient conditions, the winglets 2 are thus operating in the regions 26 and 36 of FIGS. 12 and 13. As is illustrated, the vortices form over the inboard surface of an upper winglet and over an outboard surface of a lower winglet when the aircraft is in a generally straight and level flight altitude.

We claim:

1. An aircraft wing including, main wing means (1) having a median plane (X—X) and a wing tip region of specified chord having a leading edge region (3) and a trailing edge region (4) and winglet means (2) extending upwards and/or downwards from the median plane (X—X) of said wing tip region, the winglet means having a root region (5) with both a forward extremity (6) and a rearward extremity (7) in the region of the median plane, the forward extremity of the winglet means lying at or rearward of the leading edge region of the main wing means, a tip region (8) remote from the median plane, a leading edge region (9) extending between the forward extremity and the tip region of high sweep back (Q) over at least part of its length, and a trailing edge region (10) extending between the rearward extremity of the root region and the tip region, the value of the square of the distance from the tip region to the root region divided by the area bounded by and including the root region, the tip region, the leading edge region, and the trailing edge region being 1.5 or less, and characterized by having a cambered profile which is so shaped to cause a median line (44) to droop at the leading edge region (9) in a direction outboard with reference to the main wing means when said winglet means (2) extends upwards from said median plane (X—X) and in a direction inboard with reference to the main wing means when the winglet means (2) extends downwards, whereby in air flow break-away conditions the air flow over the winglet means changes from conventional attached flow to vortex flow and the vortex sheets of said vortex flow extend over an inboard facing surface of the upwardly extending winglet means and over an outboard facing surface of the downwardly extending winglet means, and whereby the bending load exerted upon the main wing means by the presence of the winglet means increases relatively slowly as main wing lift increases.

2. An aircraft wing according to claim 1 wherein said cambered profile of the winglet means includes, when viewed in a cross section generally parallel to the line of flight the wing will adopt in use, a chordal line extending between a forward extremity and a rearward extremity of the winglet means at said cross section the length of this line being the local chord of the winglet means, a first point on the profile, a second point on the profile, said first and second points lying upon a surface facing inboard when the winglet means extends upwards and lying upon a surface facing outboard when the winglet means extends downwards, said first point having a first co-ordinate extending normal to the chordal line and being the maximum distance between said chordal line and the winglet profile at that cross section, and a second co-ordinate, extending along the chordal line, being the distance the first co-ordinate lies from the forward extremity at that cross section, said second point having a third co-ordinate, extending normal to the chordal line, and being the distance between said chordal line and the winglet profile at that cross section, and a fourth co-ordinate extending along the chordal line and being 0.05 of the local chord aft of the forward extremity, the value of said first co-ordinate divided by said second co-ordinate being equal to or less than 0.5, the value of said third co-ordinate divided by the local chord being in the range of equal to or less than 0.075 and equal to or greater than 0.025, and the value of said first co-ordinate divided by the local chord being in the range of equal to or less than 0.15 and equal to or greater than 0.025.

* * * * *